(12) United States Patent
Islam

(10) Patent No.: US 11,630,263 B2
(45) Date of Patent: Apr. 18, 2023

(54) FUSION SPLICED FIBER OPTIC CABLE ASSEMBLIES AND BREAKOUT KITS

(71) Applicant: CommScope Technologies LLC, Hickory, NC (US)

(72) Inventor: Nahid Islam, Westmont, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/818,544

(22) Filed: Mar. 13, 2020

(65) Prior Publication Data
US 2020/0301074 A1 Sep. 24, 2020

Related U.S. Application Data

(60) Provisional application No. 62/821,569, filed on Mar. 21, 2019.

(51) Int. Cl.
*G02B 6/25* (2006.01)
*G02B 6/255* (2006.01)

(52) U.S. Cl.
CPC .................................. *G02B 6/2558* (2013.01)

(58) Field of Classification Search
CPC .................................................. G02B 6/2558
(Continued)

(56) References Cited

U.S. PATENT DOCUMENTS 7,822,310 B2 10/2010 Castonguay et al.
8,005,333 B2 * 8/2011 Mullaney ............. G02B 6/4446
174/50
(Continued)

FOREIGN PATENT DOCUMENTS

DE 102005052882 A1 5/2007
EP 2439571 A2 4/2012
(Continued)

OTHER PUBLICATIONS

Notification of Transmittal of the International Search Report and the Written Opinion of the International Searching Authority, or the Declaration, in corresponding PCT Application No. PCT/US2020/022621 (dated Jul. 17, 2020).
(Continued)

*Primary Examiner* — Jerry M Blevins
(74) *Attorney, Agent, or Firm* — Myers Bigel, P.A.

(57) ABSTRACT

The present disclosure describes fusion spliced cable assemblies. An assembly may include a first and a second fiber optic cable, where an end of at least a first optical fiber from the first fiber optic cable is fusion spliced together with an end of at least a second optical fiber from the second fiber optic cable, the first optical fiber having a first length of prepared fiber extending from the spliced end of the first optical fiber to a transition point of the first optical fiber, the second optical fiber having a second length of prepared fiber extending from the spliced end of the second optical fiber to a transition point of the second optical fiber, where the transition point of the first optical fiber is a distance from the transition point of the second optical fiber, and where a total length of prepared fiber is the sum of the first length of prepared fiber for the first optical fiber and the second length of prepared fiber for the second optical fiber; a support configured to engage at least a portion of the total length of prepared fiber such that the distance between the transition points of each optical fiber is less than the total length of prepared fiber of the first and second optical fibers; and a transition housing coupled to the first and second fiber optic cables and surrounding the support. Fusion spliced cable assembly breakout kits are also provided.

17 Claims, 11 Drawing Sheets

(58) Field of Classification Search
USPC .......................................................... 385/96
See application file for complete search history.

(56) References Cited

U.S. PATENT DOCUMENTS

| | | |
|---|---|---|
| 2005/0213918 A1 | 9/2005 | Bellekens et al. |
| 2009/0060421 A1 | 3/2009 | Parikh et al. |
| 2009/0252462 A1 | 10/2009 | Bonical |
| 2010/0054687 A1 | 3/2010 | Ye et al. |
| 2011/0222562 A1 | 9/2011 | Jiang et al. |
| 2012/0328258 A1 | 12/2012 | Barron et al. |
| 2013/0251319 A1* | 9/2013 | Compton ............. G02B 6/4495 385/99 |
| 2015/0253503 A1* | 9/2015 | Saito ................... G02B 6/4436 385/96 |
| 2016/0334579 A1 | 11/2016 | Park et al. |
| 2017/0075067 A1 | 3/2017 | Filipowicz et al. |
| 2017/0097487 A1 | 4/2017 | Vastmans et al. |
| 2018/0109062 A1 | 4/2018 | Fidric et al. |
| 2020/0081218 A1* | 3/2020 | Wu ................... G02B 6/02395 |

FOREIGN PATENT DOCUMENTS

| | | |
|---|---|---|
| JP | S5849907 A | 3/1983 |
| JP | S5880609 A | 5/1983 |
| JP | H11218621 A | 8/1999 |

OTHER PUBLICATIONS

Communication pursuant to Rule 114(2) EPC, EP Application No. 20772747.0, dated Aug. 3, 2022, 13 pp.
Pages from Product Catalog—FICONET® systems superior network components, 2014, 2015, 2018, 27 pp.
EFB Elektronik GMBHH, DATENBLATT—Micro Spleißverteiler mit Telekom—Spleißkassette, Date Unknown, 5 pp.
EFB Elektronik GMBH, DATENBLATT—Micro-Spleißbox mit Telekom-Spleißassette für 12 Spleisse, Art.-Nr. 53700.1V2, Oct. 16, 2015, 2 pp.
Huber+Suhner, Pages from Fiber Optic System Catalogue LiSA, Edition 2005, 2005, 55 pp.
"Communication with Supplementary European Search Report", EP Application No. 20772747.0, dated Nov. 15, 2022.

* cited by examiner

FUSION SPLICED FIBER OPTIC CABLE ASSEMBLIES AND BREAKOUT KITS

RELATED APPLICATION(S)

The present application claims priority from and the benefit of U.S. Provisional Patent Application Ser. No. 62/821,569, filed Mar. 21, 2019, the disclosure of which is hereby incorporated herein in its entirety.

FIELD

The present application is directed generally toward fusion spliced cable assemblies, and more particularly fusion spliced cable assemblies and breakout kits for optical cables.

BACKGROUND

It is common practice to fusion splice optical fibers in the field or in a factory to connect two or more cables or pieces of equipment together. Currently, after the optical fibers are spliced together, large splice trays, enclosure boxes or long rigid tubes are used to protect the spliced optical fibers (see, e.g., tube 10 in FIG. 1). However, these protective enclosures may occupy considerable space and can restrict the flexibility of the cables or pieces of equipment being spliced together.

SUMMARY

A first aspect of the present invention is directed to a fusion spliced cable assembly. The assembly may include a first and a second fiber optic cable, where an end of at least a first optical fiber from the first fiber optic cable is fusion spliced together with an end of at least a second optical fiber from the second fiber optic cable. The first optical fiber has a first length of prepared fiber extending from the spliced end of the first optical fiber to a transition point of the first optical fiber and the second optical fiber has a second length of prepared fiber extending from the spliced end of the second optical fiber to a transition point of the second optical fiber. The transition point of the first optical fiber is a distance from the transition point of the second optical fiber and a total length of prepared fiber is equal to the sum of the first length of prepared fiber for the first optical fiber and the second length of prepared fiber for the second optical fiber. The assembly may further include a support configured to engage at least a portion of the total length of prepared fiber such that the distance between the transition points of each optical fiber is less than the total length of prepared fiber of the first and second optical fibers and a transition housing coupled to the first and second fiber optic cables and surrounding the support.

Another aspect of the present invention is directed to a fusion spliced cable assembly. The assembly may include a first and a second fiber optic cable, where an end of at least a first optical fiber from the first fiber optic cable is fusion spliced together with an end of at least a second optical fiber from the second fiber optic cable. The first optical fiber has a first length of prepared fiber extending from the spliced end of the first optical fiber to a transition point of the first optical fiber and the second optical fiber has a second length of prepared fiber extending from the spliced end of the second optical fiber to a transition point of the second optical fiber. The transition point of the first optical fiber is a distance from the transition point of the second optical fiber, and a total length of prepared fiber is equal to the sum of the first length of prepared fiber for the first optical fiber and the second length of prepared fiber for the second optical fiber. The assembly may further include a support configured to engage at least a portion of the total length of prepared fiber such that the distance between the transition points of each optical fiber is less than the total length of prepared fiber of the first and second optical fibers. The support may include pre-formed grooves configured to receive and secure at least a portion of the total length of prepared fiber in a folded condition within the support. The assembly may further include a transition housing coupled to the first and second fiber optic cables and surrounding the support.

Another aspect of the present invention is directed to a fusion spliced cable assembly. The assembly may include a first and a second fiber optic cable, where an end of at least a first optical fiber from the first fiber optic cable is fusion spliced together with an end of at least a second optical fiber from the second fiber optic cable. The first optical fiber has a first length of prepared fiber extending from the spliced end of the first optical fiber to a transition point of the first optical fiber and the second optical fiber has a second length of prepared fiber extending from the spliced end of the second optical fiber to a transition point of the second optical fiber. The transition point of the first optical fiber is a distance from the transition point of the second optical fiber, and a total length of prepared fiber is equal to the sum of the first length of prepared fiber for the first optical fiber and the second length of prepared fiber for the second optical fiber. The support may include a generally cylindrical mandrel configured to engage at least a portion of the total length of prepared fiber. The engaged portion of the total length of prepared fiber is coiled around the mandrel such that the distance between the transition points of each optical fiber is less than the total length of prepared fiber of the first and second optical fibers. The assembly may further include a transition housing coupled to the first and second fiber optic cables and surrounding the support.

Another aspect of the present invention is directed to a fusion spliced cable assembly breakout kit. The breakout kit may include at least one fiber optic cable having at least a first optical fiber, the first optical fiber having a first length of prepared fiber. The breakout kit may include a terminated cable assembly having at least a second optical fiber, the second optical fiber having a second length of prepared fiber. A total length of prepared fiber is the sum of the first length of prepared fiber for the first optical fiber and the second length of prepared fiber for the second optical fiber. The breakout kit may include a fusion splice transition housing, where an end of the first optical fiber from the fiber optic cable is fusion spliced together with an end of the second optical fiber from the terminated cable assembly, the fusion spliced ends of the first and second optical fibers being secured within the fusion splice transition housing.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1:
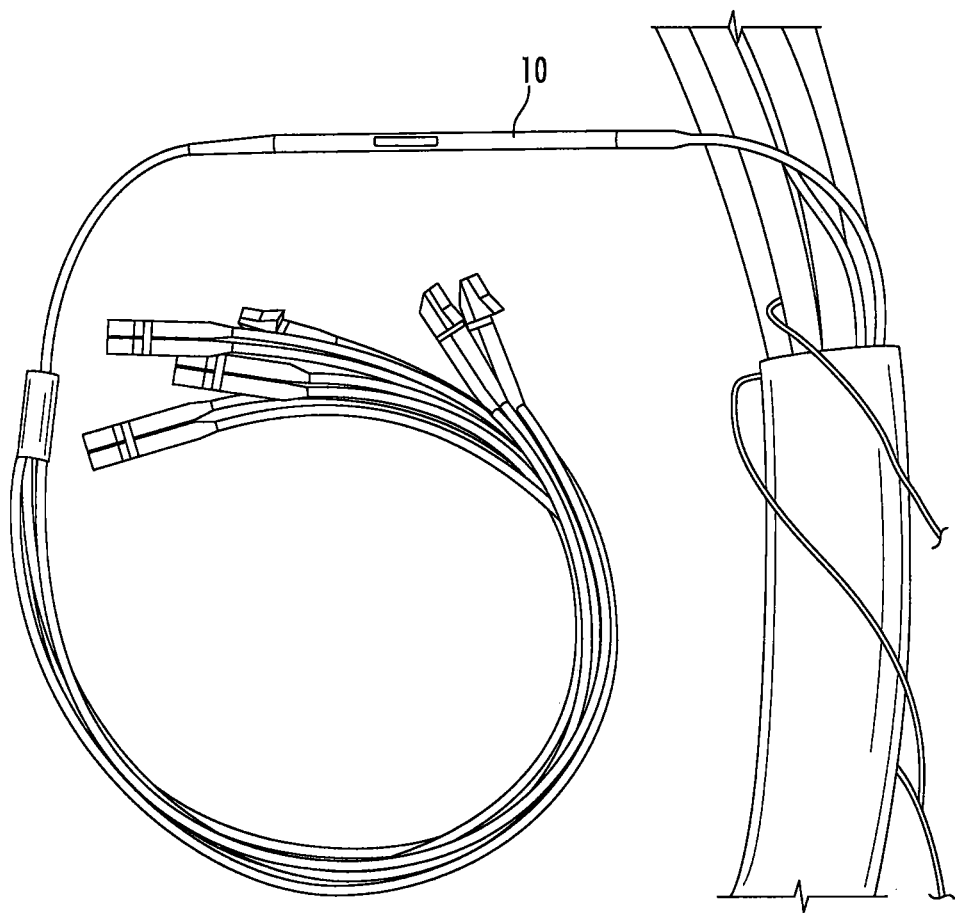
FIG. 1 is a photograph of a prior art fusion splice optical fiber assembly having a long rigid tube protecting the fusion splice.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention now will be described more fully hereinafter with reference to the accompanying drawings, in which illustrative embodiments of the invention are shown.

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Pursuant to embodiments of the present invention, fusion spliced cable assemblies for optical fibers are provided that may eliminate the need to use long rigid enclosures to protect the spliced fibers by integrating a ruggedized and compact transition area into the assembly. The fusion spliced cable assemblies of the present invention may be used to house, organize and secure fusion spliced optical fibers. The fusion spliced cable assemblies of the present invention may reduce the space between optical fibers that have been spliced together while maintaining the minimum bend radius of the spliced fibers, and protect the splice area from being damaged (e.g., bending and breaking). Embodiments of the present invention will now be discussed in greater detail with reference to FIGS. 2-8C.

Fusion splicing is the process of fusing or welding two fibers together usually by an electric arc. The goal of fusion splicing is to fuse the two fibers end-to-end in such a way that light passing through the fibers is not scattered or reflected back by the splice, and so that the splice and region surrounding the splice are almost as strong as the intact fibers. Before two fibers can be fusion spliced together, the fibers must be prepared.

Methods of preparing optical fibers for fusion splicing are well-known and embodiments of the present invention are not limited to a specific method of preparation. Typically, preparation of the fibers may include the fibers being (1) stripped, (2) cleaned, and (3) cleaved. First, an adequate amount of the protective coating, jacket, or cladding is removed or stripped away from the ends of each optical fiber that will be spliced together. Fiber optical stripping is usually carried out by using a mechanical stripping device similar to a wire-stripper. Other special stripping methods that utilize hot sulfuric acid or a controlled flow of hot air may be used to remove the coating. Next, the bare fibers should be cleaned. The customary means to clean the fibers is with alcohol (e.g., isopropyl alcohol) and wipes. However, given the hydroscopic nature of isopropyl alcohol, its use is less desirable than other known chemicals. Finally, each fiber is cleaved using the score-and-break method so that the end-face of each fiber is perfectly flat and perpendicular to the axis of the fiber. In fusion splicing, splice loss is a direct function of the angles and quality of the two fiber-end faces, i.e., the closer to 90 degrees the cleave angle, the lower the optical loss the splice will yield. As used herein, the section of each optical fiber that has been prepared in this manner or in a similar manner will be referred to as "the prepared fibers."

Figure 2:
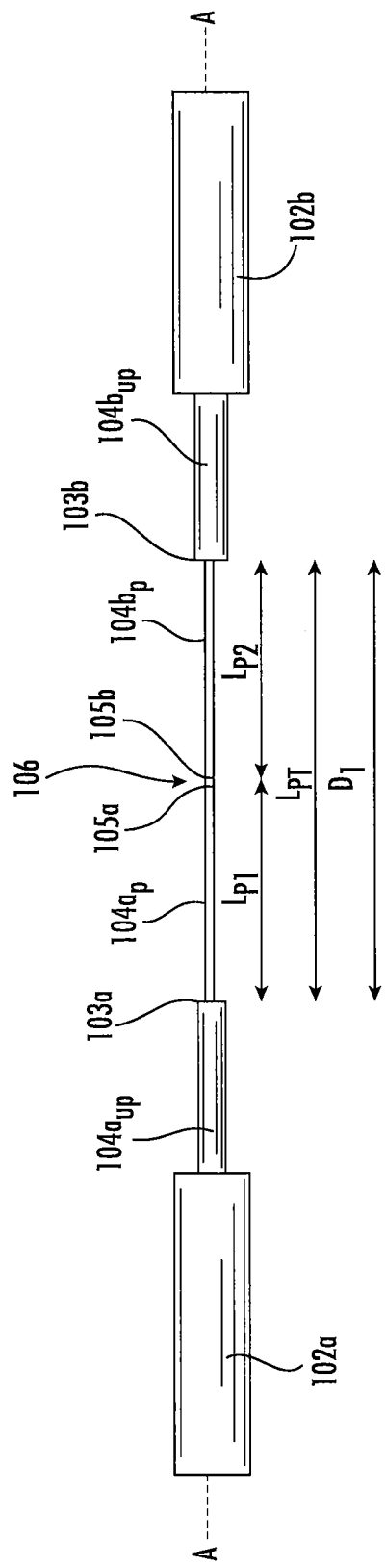
FIG. 2 is a side view of two optical fibers that have been fusion spliced together according to embodiments of the present invention.
Figure 3A:
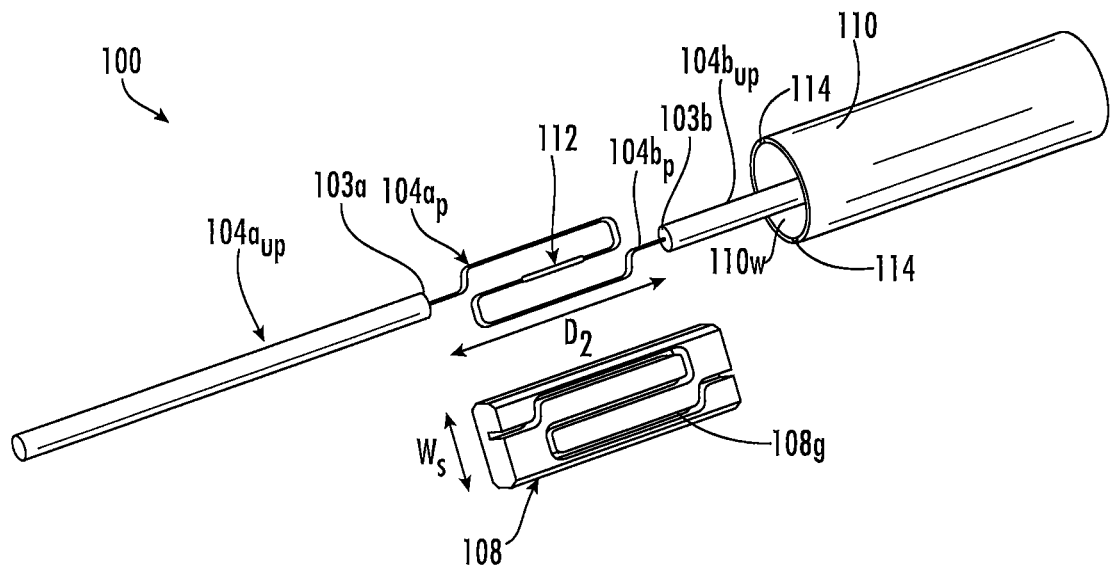
FIGS. 3A-3C are exploded and assembled perspective views of a fusion spliced cable assembly according to embodiments of the present invention.
Figure 3B:
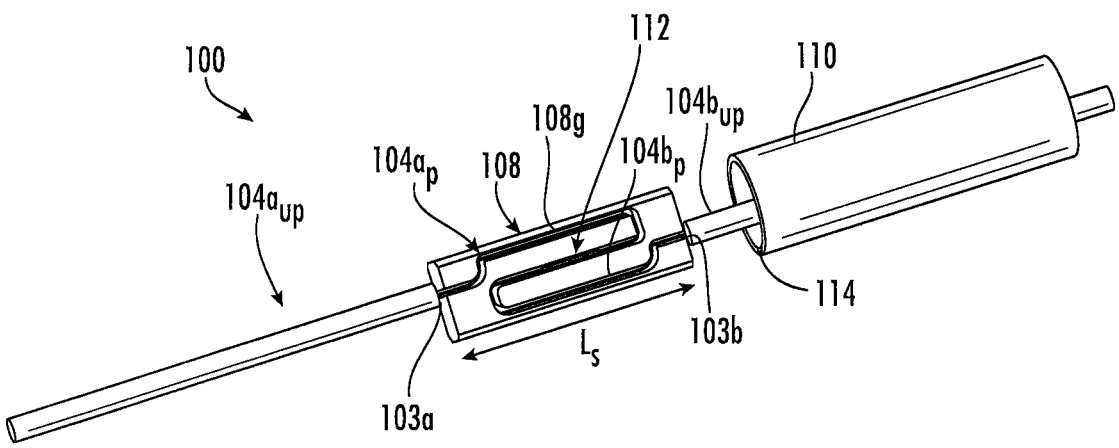
Figure 3C:
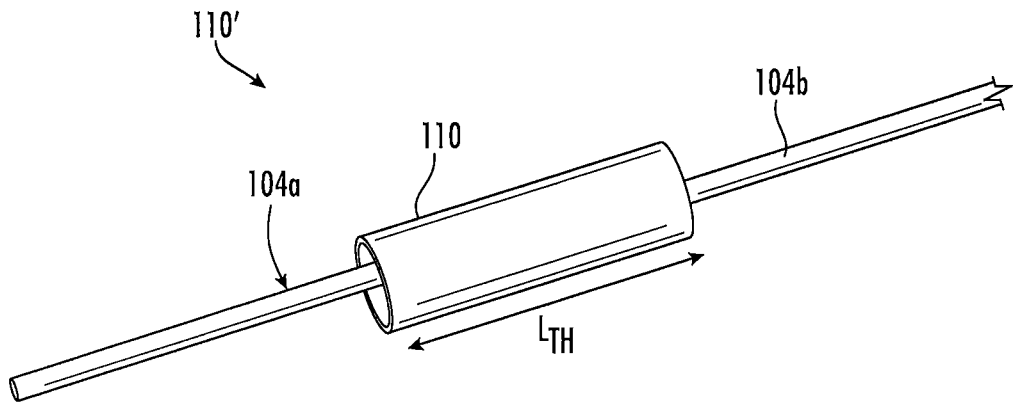
Figure 4:
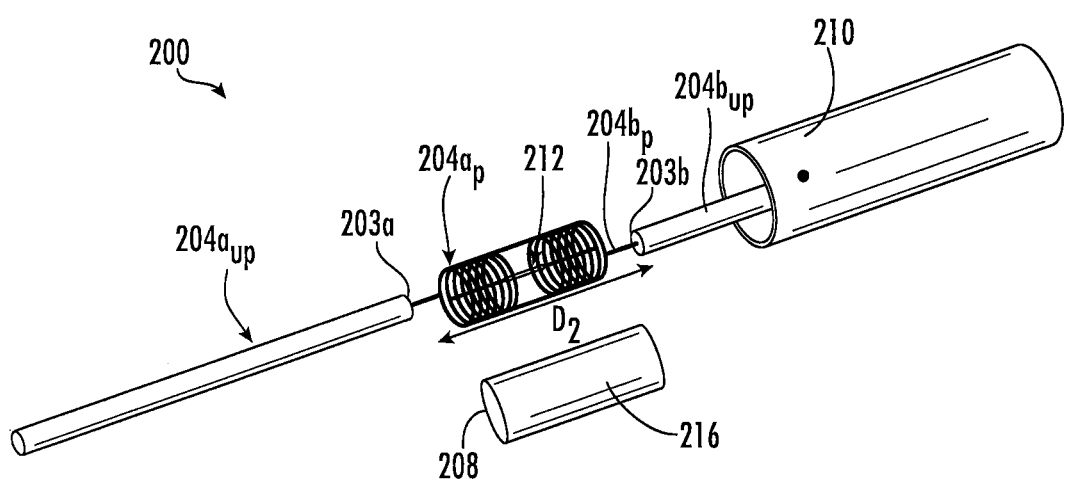
FIG. 4 is an exploded perspective view of another fusion spliced cable assembly according to embodiments of the present invention.

Referring to now FIGS. 2-4, a fusion spliced cable assembly 100 according to embodiments of the present invention is illustrated. In some embodiments, a fusion spliced cable assembly 100 of the present invention may include a first fiber optic cable 102a and a second fiber optic cable 102b. Each fiber optic cable 102a, 102b includes at least one optical fiber 104a, 104b that will be fusion spliced together. FIG. 2 illustrates two optical fibers 104a, 104b that have been fusion spliced together at splice area 106. As shown in FIG. 2, an end 105a of the first optical fiber 104a from the first fiber optic cable 102a is spliced together with an end 105b of the second optical fiber 104b from the second fiber optic cable 102b. In some embodiments, the optical fibers 104a, 104b may comprise ribbonized optical fibers (see, e.g., FIGS. 8B-8C).

Before the ends 105a, 105b of the optical fibers 104a, 104b are spliced together, the optical fibers 104a, 104b are prepared as discussed above. After the optical fibers 104a, 104b have gone through the preparation process, the first optical fiber 104a will have a first length ($L_{P1}$) of prepared fiber 104$a_p$ and the second optical fiber 104b will have a second length ($L_{P2}$) of prepared fiber 104$b_p$ (see, e.g., FIG. 2). The first length ($L_{P1}$) of prepared fiber 104$a_p$ extends from the spliced end 105a of the first optical fiber 104a to a transition point 103a of the first optical fiber 104a. Similarly, the second length ($L_{P2}$) of the prepared fiber 104$b_p$ extends from the spliced end 105b of the second optical fiber 104b to a transition point 103b of the second optical fiber 104b. Thus, the total length ($L_{PT}$) of prepared fiber 104$a_p$, 104$b_p$ is equal to the sum of the first length ($L_{P1}$) of prepared fiber 104$a_p$ for the first optical fiber 104a and the second length ($L_{P2}$) of prepared fiber 104$b_p$ for the second optical fiber 104b or ($L_{P1}$)+($L_{P2}$)=($L_{PT}$). In some embodiments, the length $L_{P1}$, $L_{P2}$ of each prepared fiber 104$a_p$, 104$b_p$ is in the range of about 60 mm to about 200 mm. In some embodiments, the total length ($L_{PT}$) of prepared fiber 104$a_p$, 104$b_p$ is in the range of about 70 mm to about 500 mm.

Note that each transition point 103a, 103b represents the point along a longitudinal axis (A) of the respective optical fiber 104a, 104b where the protective coating (or cladding) of the optical fiber 104a, 104b has not been removed or stripped away. In other words, the transition point 103a, 103 represents the point along the optical fiber 104a, 104b where the fibers 104a, 104b "transition" from a prepared fiber 104$a_p$, 104$b_p$ to an unprepared fiber 104$a_{up}$, 104$b_{up}$.

Still referring to FIG. 2, after the ends 105a, 105b of the optical fibers 104a, 104b have been fusion spliced together, the transition point 103a of the first optical fiber 104a is a first distance ($D_1$) from the transition point 103b of the second optical fiber 104b. Typically, at this time, the distance ($D_1$) between the transition points 103a, 103b is approximately equal to the total length ($L_{PT}$) of the prepared fibers 104$a_p$, 104$b_p$. In some embodiments, the distance ($D_1$) between the transition points 103a, 103b of the optical fibers 104a, 104b is in a range of about 120 mm and about 500 mm. At this point in the process, prior known fusion spliced cable assemblies would encapsulate the splice area 106 and the prepared fibers 104$a_p$, 104$b_p$ with a long sleeve or enclosure (e.g., tube 10 in FIG. 1) that spans the entire distance ($D_1$) between the transition points 103a, 103b of the optical fibers 104a, 104b. As discussed above, these long protective sleeves can occupy considerable space and can restrict the flexibility of the optical fibers being spliced together. These shortcomings can be addressed via cable assembly embodiments described below.

Referring now to FIGS. 3A-3C, in some embodiments, the fusion spliced cable assembly 100 of the present invention may include a support 108. The support 108 may be configured to engage at least a portion of the total length ($L_{PT}$) of the prepared fibers 104$a_p$, 104$b_p$. As shown in FIGS. 3A-3B, after the prepared fibers 104$a_p$, 104$b_p$ have been spliced together, the prepared fibers 104$a_p$, 104$b_p$ may be bent or folded to engage the support 108. In some embodiments, at least a portion of the first length ($L_{P1}$) of the prepared fiber 104$a_p$ of the first optical fiber 104a and/or at least a portion of the second length ($L_{P2}$) of the prepared fiber 104$b_p$ of the second optical fiber 104b is substantially perpendicular to the longitudinal axis (A) of the first and/or second optical fiber 104a, 104b. In some embodiments, at least two portions of the first length ($L_{P1}$) of the prepared fiber 104$a_p$ of the first optical fiber 104a and/or the second length ($L_{P2}$) of prepared fiber 104$b_p$ of the second optical fiber 104b are substantially perpendicular to a longitudinal axis (A) of the first and/or second optical fiber 104a, 104b.

In some embodiments, the support 108 may comprise pre-formed grooves 108g. The grooves 108g may be configured to receive and secure at least a portion of the total length ($L_{PT}$) of the prepared fibers 104$a_p$, 104$b_p$ in a bent or folded condition within the support 108 (see, e.g., FIG. 3B). In some embodiments, the total length ($L_{PT}$) of the prepared fibers 104$a_p$, 104$b_p$ may be engaged with the support 108 such that the edges of the support 108 are adjacent to or in contact with the transition points 103a, 103b of the optical fibers 104a, 104b (see, e.g., FIG. 3B).

In order to allow the prepared fibers 104$a_p$, 104$b_p$ to be bent or folded to engage the support 108, high bend-insensitive optical fibers 104a, 104b having a small bend radius may be used. Utilizing optical fibers 104a, 104b having a small or compact bend radius allows the prepared fibers 104$a_p$, 104$b_p$ to be bent or folded to engage the support 108 without high optical loss or risk of damaging the optical fibers 104a, 104b. In some embodiments, the optical fibers 104a, 104b may have a bend radius in the range of about 2.5 mm to about 7.5 mm. For example, in some embodiments, the optical fibers 104a, 104b may have a bend radius of 2.5 mm, 5 mm, or 7.5 mm.

Bending or folding the prepared fibers $104a_p$, $104b_p$ to engage the support 108 allows the transition points 103a, 103b of each optical fiber 104a, 104b to be drawn closer to each other. This results in a smaller or more compact transition area for the fusion spliced optical fibers 104a, 104b (i.e., the distance (D) between the transition points 103a, 103b). For example, in some embodiments, the support 108 may be configured to engage the prepared fibers $104a_p$, $104b_p$ such that a second distance ($D_2$) between the transition points 103a, 103b of each optical fiber 104a, 104b is less than the total length ($L_{PT}$) of the prepared fibers $104a_p$, $104b_p$ (i.e., $D_2 < D_r$).

As shown in FIGS. 3A-3B, in some embodiments, the support 108 may be rectangular in shape having a length ($L_S$) and a width ($W_S$). In some embodiments, support 108 may have a length ($L_S$) in the range of about 40 mm to about 80 mm and a width ($W_S$) in the range of about 10 mm to about 40 mm. In some embodiments, the length ($L_S$) of the support 108 is approximately equal to the second distance ($D_2$) between the transition points 103a, 103b of the optical fibers 104a, 104b. The support 108 of the present invention may be formed in a variety of different shapes, such as, for example, cylindrical (see, e.g., FIG. 4A), prismatic, square or elliptical.

In some embodiments, the fusion spliced cable assembly 100 may include a transition housing 110. As shown in FIG. 3C, the transition housing 110 has a length ($L_{TH}$) and may be coupled to the first and second fiber optic cables 102a, 102b. In some embodiments, the transition housing 110 may have a length ($L_{TH}$) in the range of about 40 mm to about 200 mm. In some embodiments, the transition housing 110 may be cylindrical in shape. However, the transition housing 110 of the present invention may be formed in a variety of different shapes, such as, for example, rectangular or square.

After the prepared fibers $104a_p$, $104b_p$ have been engaged with the support 108, the transition housing 110 may be slid over and surround the support 108 to protect and/or further secure support 108 and the spliced together prepared fibers $104a_p$, $104b_p$. In some embodiments, the transition housing 110 has a sufficient length ($L_{TH}$) such that each transition point 103a, 103b is within the transition housing 110 (i.e., the length ($L_{TH}$) of the transition housing is greater than the second distance ($D_2$) between the transition points 103a, 103b). In some embodiments, an adhesive heat shrink tube or an over-molding may be used to encapsulate the transition housing 110 and further seal/protect the support 108 and spliced fibers 104a, 104b from, for example, moisture and UV light. In some embodiments, the transition housing 110 may comprise thermal expansion/contraction compensation features (or flexible material) to protect the spliced optical fibers 104a, 104b from experiencing any strain and/or stress in any environmental condition.

In some embodiments, the transition housing 110 may comprise one or more slots 114. The slots 114 may extend along the length ($L_{TH}$) of one or more interior walls 110w of the transition housing 110. In some embodiments, the slots 114 may be configured to receive and secure the support 108 within the transition housing 110. In some embodiments, the transition housing 110 may be filled with a material to further seal and protect the support 108 and fusion spliced optical fibers 104a, 104b within the transition housing 110. For example, in some embodiments, the transition housing 110 may be filled with an optical adhesive or a potting compound.

In some embodiments, the fusion spliced cable assembly 100 of the present invention may further comprise a fusion splice protection tube 112. The fusion splice protection tube 112 surrounds the spliced ends 105a, 105b of the first and second optical fibers 104a, 104b and may help to protect the splice area 106 from being damaged (e.g., bending and breaking). In some embodiments, the fusion splice protection tube 112 may be secured inside or outside of the transition housing 110.

Another fusion spliced cable assembly 200 according to embodiments of the present invention is illustrated in FIG. 4. As shown in FIG. 4, in some embodiments, the support 208 may comprise a mandrel 216. In some embodiments, the mandrel 216 may be generally cylindrical in shape. In some embodiments, at least a portion of the total length ($L_{PT}$) of the prepared fibers $204a_p$, $204b_p$ may be coiled around the mandrel 216. In some embodiments, after the prepared fibers $204a_p$, $204b_p$ have been coiled around the mandrel 216 of the support 208, the mandrel 216 may be removed. In some embodiments, the mandrel 216 may be removed prior to the transition housing 210 being slid over the spliced optical fibers 204a, 204b. In some embodiments, at least a portion of the prepared fibers $204a_p$, $204b_p$ may be engaged and secured in a coiled condition with the support 208. In some embodiments, filament-type pre-impregnated composite fibers ("pre-preg") may be used to secure or coil the prepared fibers $204a_p$, $204b_p$ to the support 208.

Figure 5A:
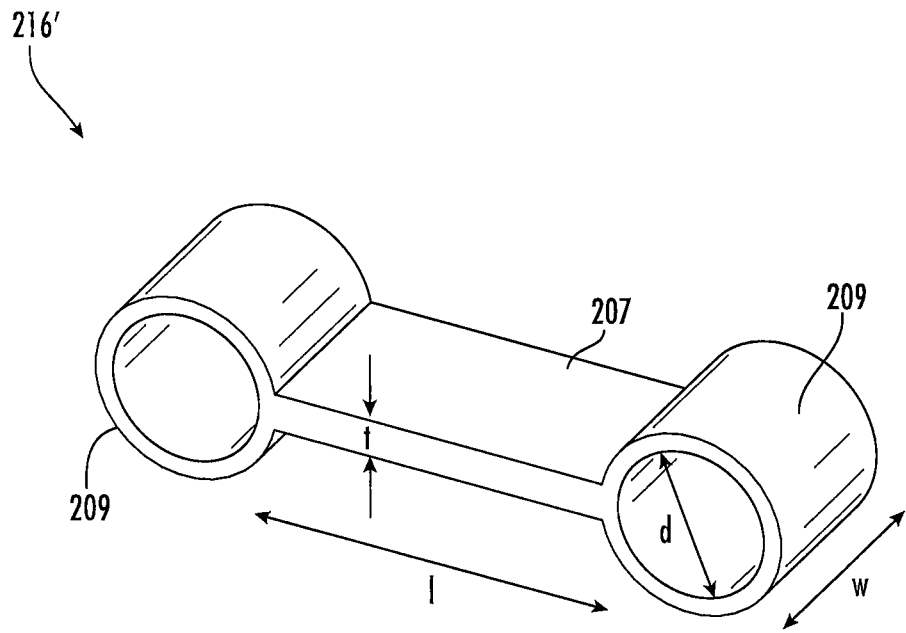
FIG. 5A is perspective view of an alternative mandrel that may be used with the fusion spliced cable assembly of FIG. 4 according to embodiments of the present invention.
Figure 5B:
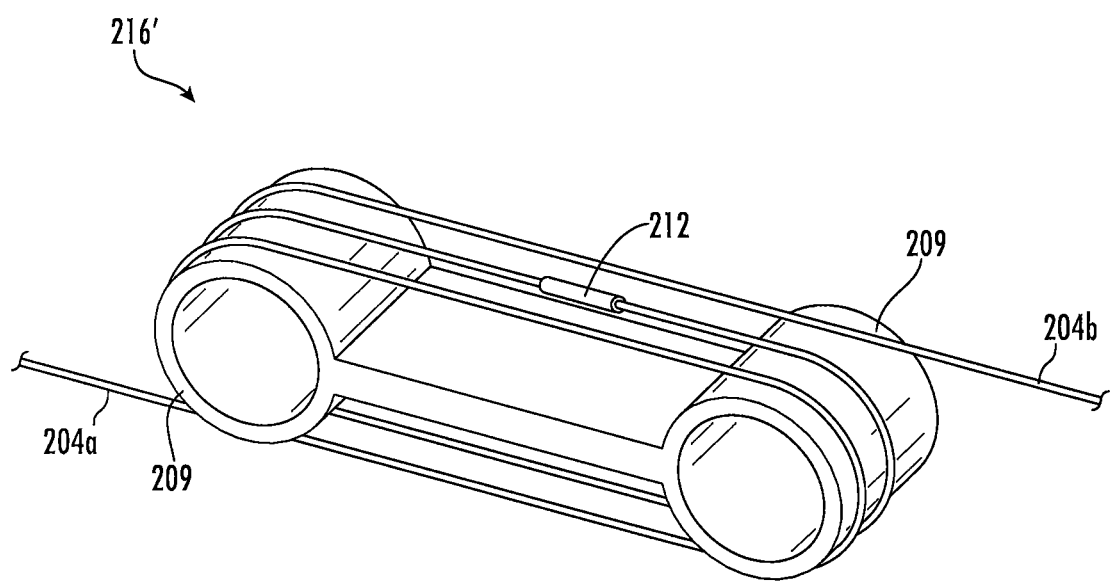
FIG. 5B is a perspective view of two fusion spliced optical fibers wrapped around the mandrel of FIG. 5A according to embodiments of the present invention.

Referring now to FIGS. 5A-5B, in some embodiments, the support 208 of the fusion spliced cable assembly 200 of the present invention may comprise an alternative mandrel 216'. As shown in FIG. 5A, in some embodiments, the mandrel 216' may comprise a base member 207 having a length (l), a width (w), and a thickness (t). In some embodiments, the base member 207 may have a length (l) in the range of about 10 mm to about 50 mm, a width (w) in the range of about 0 mm (i.e., no hole) to about 20 mm, and a thickness (t) in the range of about 1 mm to about 10 mm. The mandrel 216' may further comprise two end members 209, each end member 209 having a diameter (d) and a width (w) (the width (w) of the end members 209 being equal to the width (w) of the base member 207). Each end member 209 resides on an opposite end of the base member 207 and may be coupled to or integral with the base member 207. In some embodiments, the end members 209 may have a generally cylindrical shape. For example, in some embodiments, each end member 209 may have a diameter (d) in the range of 10 mm to about 40 mm. The end members 209 may be hollow or solid.

Similar to the cylindrical mandrel 216 discussed above, the mandrel 216' may be configured to engage at least a portion of the total length ($L_{PT}$) of the prepared fibers $204a_p$, $204b_p$. For example, as shown in FIG. 5B, in some embodiments, at least a portion of the total length ($L_{PT}$) of the prepared fibers $204a_p$, $204b_p$ may be wrapped along the length (l) of the base member 207 and around each of the end members 209. In some embodiments, once the prepared fibers $204a_p$, $204b_p$ are wrapped around the mandrel 216' of the support 208, the mandrel 216' may be removed. In some embodiments, at least a portion of the prepared fibers $204a_p$, $204b_p$ is engaged and secured in a wrapped condition with the mandrel 216' of the support 208.

Referring now to FIGS. 6A-6E, a fusion splice cable assembly breakout kit 300 according to embodiments of the present invention is illustrated. In some embodiments, the breakout kit 300 may include at least one fiber optic cable 302 having at least a first optical fiber 304b, the first optical fiber 304a having a first length ($L_{P1}$) of prepared fiber $304a_p$ (similar to discussed above).

Figure 6A:
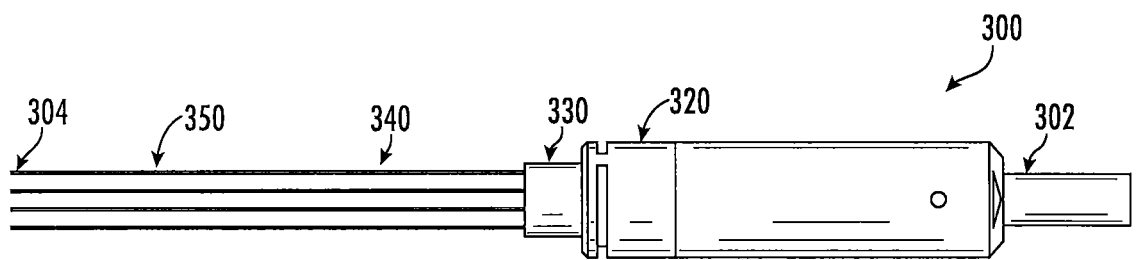
FIG. 6A is a side view of a fusion spliced cable assembly breakout kit according to embodiments of the present invention.
Figure 6B:
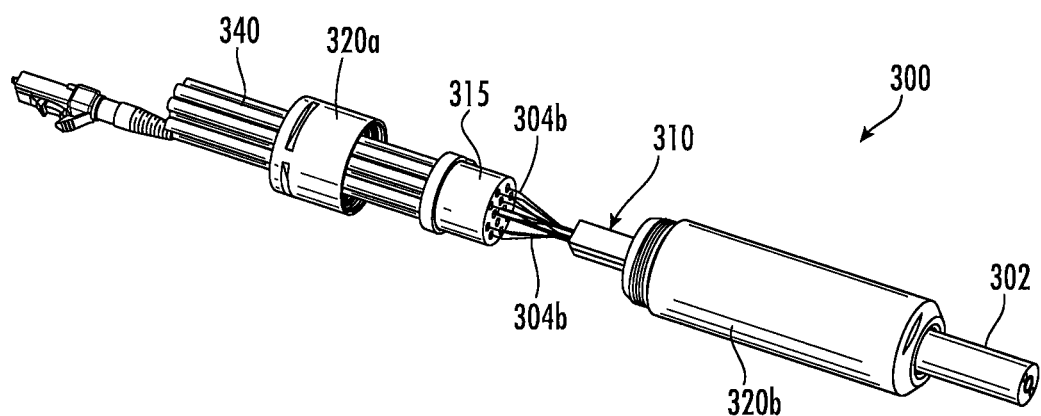
FIG. 6B is an exploded view of the fusion spliced cable assembly breakout kit of FIG. 6A.
Figure 6C:
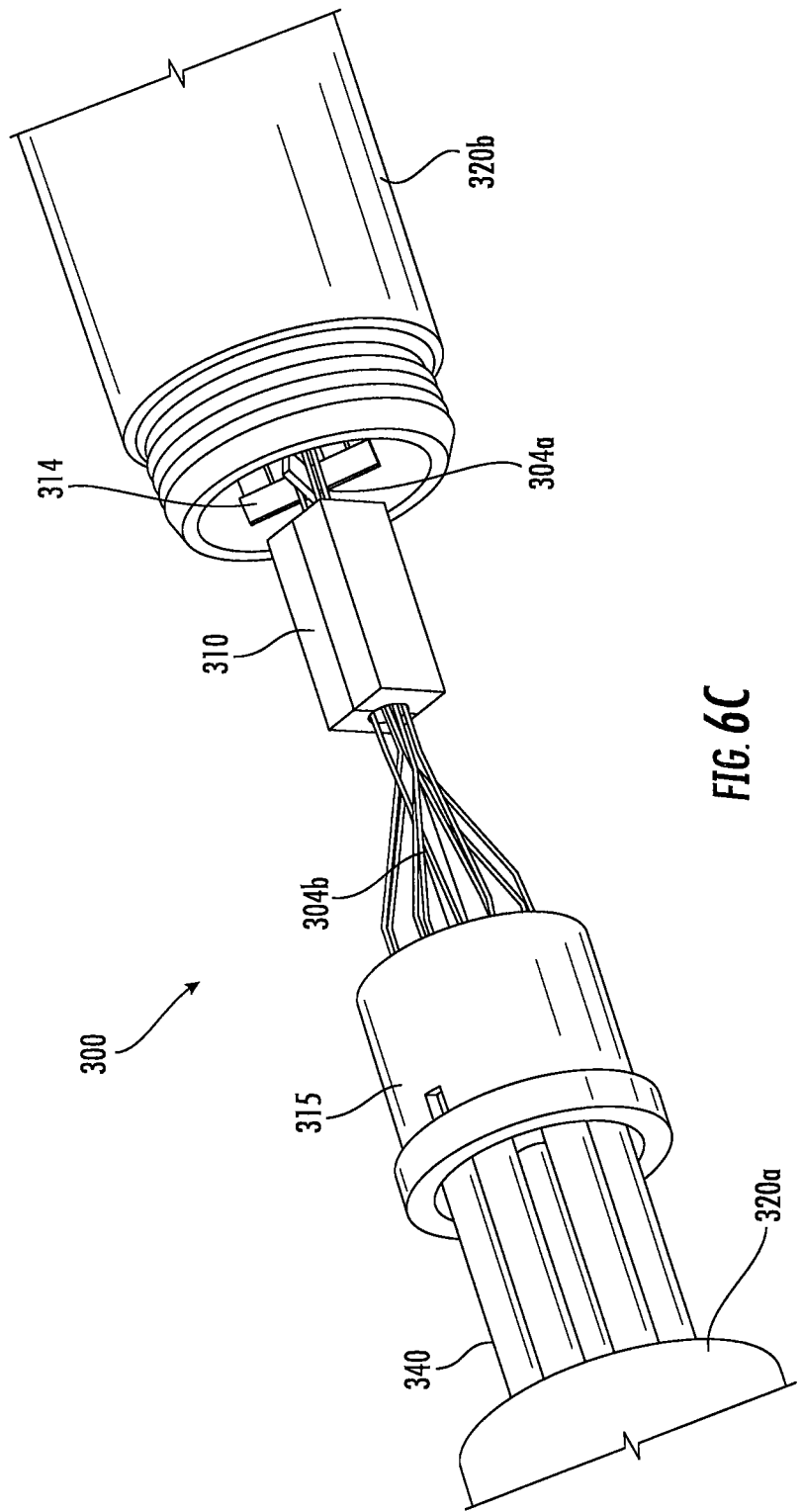
FIG. 6C is an enlarged view of the fusion spliced housing of the fusion spliced cable assembly breakout kit of FIGS. 6A-6B.
Figure 6D:
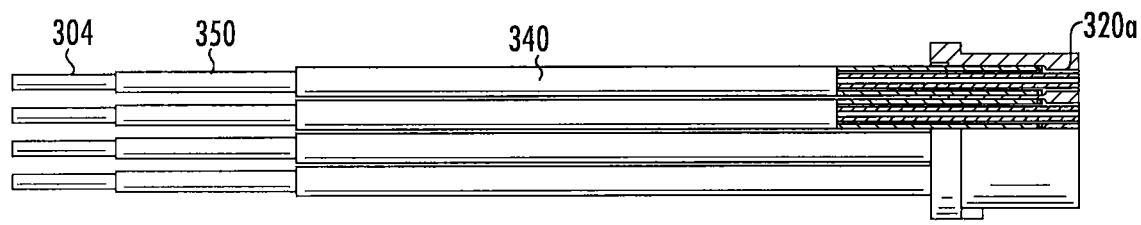
FIG. 6D is a side view of the furcation tubes and protective sleeve of the fusion spliced cable assembly breakout kit of FIG. 6A.
Figure 6E:
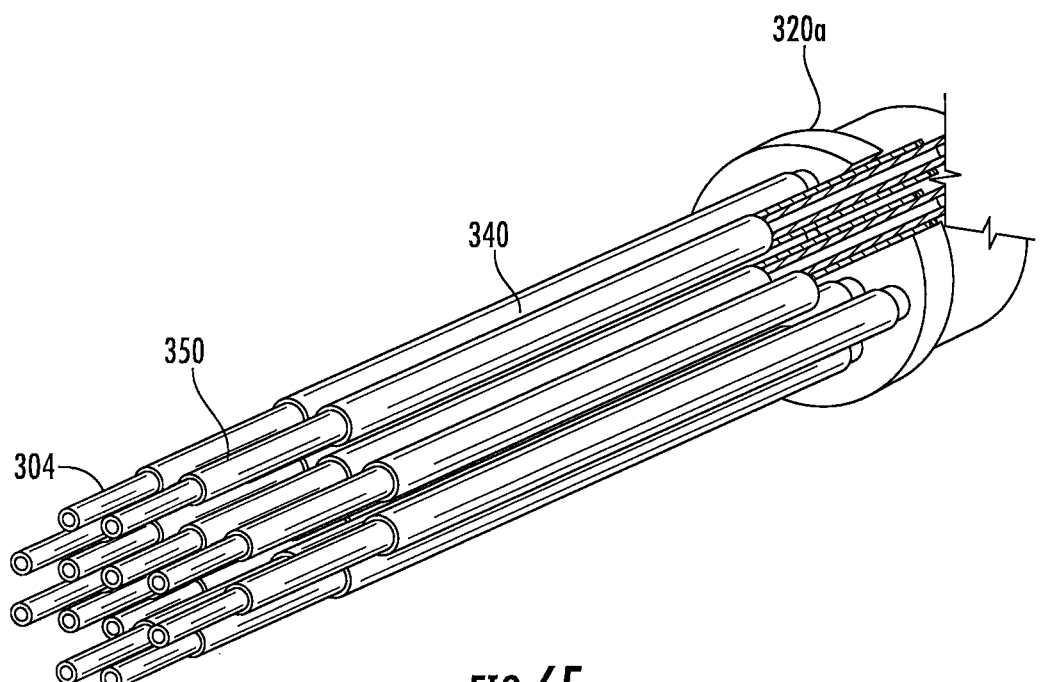
FIG. 6E is an enlarged perspective view of the furcation tubes and protective sleeve shown in FIG. 6C.

As shown in FIGS. 6A, 6D, and 6E, in some embodiments, the breakout kit 300 may include a terminated cable assembly 315 and a plurality of furcation tubes 340. Each furcation tube 340 may have an inner tube 350 which surrounds a plurality of optical fibers 304. As shown in FIG. 6B, the plurality of furcation tubes 340 extends outwardly from one end of the terminated cable assembly 315. In some embodiments, the furcation tubes 340 may comprise Kevlar® polymer.

In some embodiments, at least a second optical fiber 304b of the plurality optical fibers 304 from the terminated cable assembly 315 is prepared to be fusion spliced together with the first optical fiber 304a of the fiber optic cable 302. The second optical fiber 304b has a second length ($L_{P2}$) of prepared fiber $304b_p$. The prepared fibers $304a_p$, $304b_p$ have a total length ($L_{PT}$) that is equal to the sum of the first length ($L_{P1}$) of prepared fiber $304a_p$ for the first optical fiber 304a and the second length ($L_{P2}$) of prepared fiber $304b_p$ for the second optical fiber 304b, i.e., ($L_{p1}$)+($L_{P2}$)=($L_{PT}$). In some embodiments, an end of the first optical fiber 304a from the fiber optic cable 302 is fusion spliced together with an end of the second optical fiber 304b from the terminated cable assembly 315.

As shown in FIGS. 6B-6C, in some embodiments, the breakout kit 300 may further include a fusion splice transition housing 310. The transition housing 310 is similar to embodiments described above. In some embodiments, the spliced ends of the first and second optical fibers 304a, 304b are secured within the fusion splice transition housing 310.

As shown in FIGS. 6A-6B, the fusion splice cable assembly breakout kit 300 may further include a protective sleeve 320 around the fusion splice transition housing 310 and the terminated cable assembly 315. As shown in FIG. 6B, in some embodiments, the protective sleeve 320 may comprise a main body 320b and a top 320a. The top 320a of the protective sleeve 320 may be configured to be secured to the main body 320b of the protective sleeve 320. For example, in some embodiments, the top 320a and the main body 320b of the protective sleeve 320b may each comprise threads that are configured to cooperate with each other such that the top 320a may be screwed onto and secured to the main body 320b. As shown in FIG. 6B, the plurality of furcation tubes 340 extends through one or more openings in the top 320a of the protective sleeve 320. In some embodiments, the furcation tubes 340 and/or inner tubes 350 may be bonded to the top 320a of the protective sleeve (see, e.g., FIGS. 6D-6E).

As shown in FIG. 6C, in some embodiments, the main body 320b of the protective sleeve 320 may comprise a slot 314. In some embodiments, the slot 314 may be configured to receive and secure the transition housing 310 within the protective sleeve 320. In some embodiments, the protective sleeve 320 may be filled with a material to seal and protect the transition housing 310 and fusion spliced optical fibers 304a, 304b within the transition housing 310. For example, in some embodiments, the protective sleeve 320 may be filled with an optical adhesive or a potting compound. In some embodiments, a heat shrink tube 330 (or over-molding) may be used where the furcation tubes 340 exit the top 320a of the protective sleeve 320. The heat shrink tube 330 may help to further seal and protect from moisture entering the protective sleeve 320.

Figure 7:
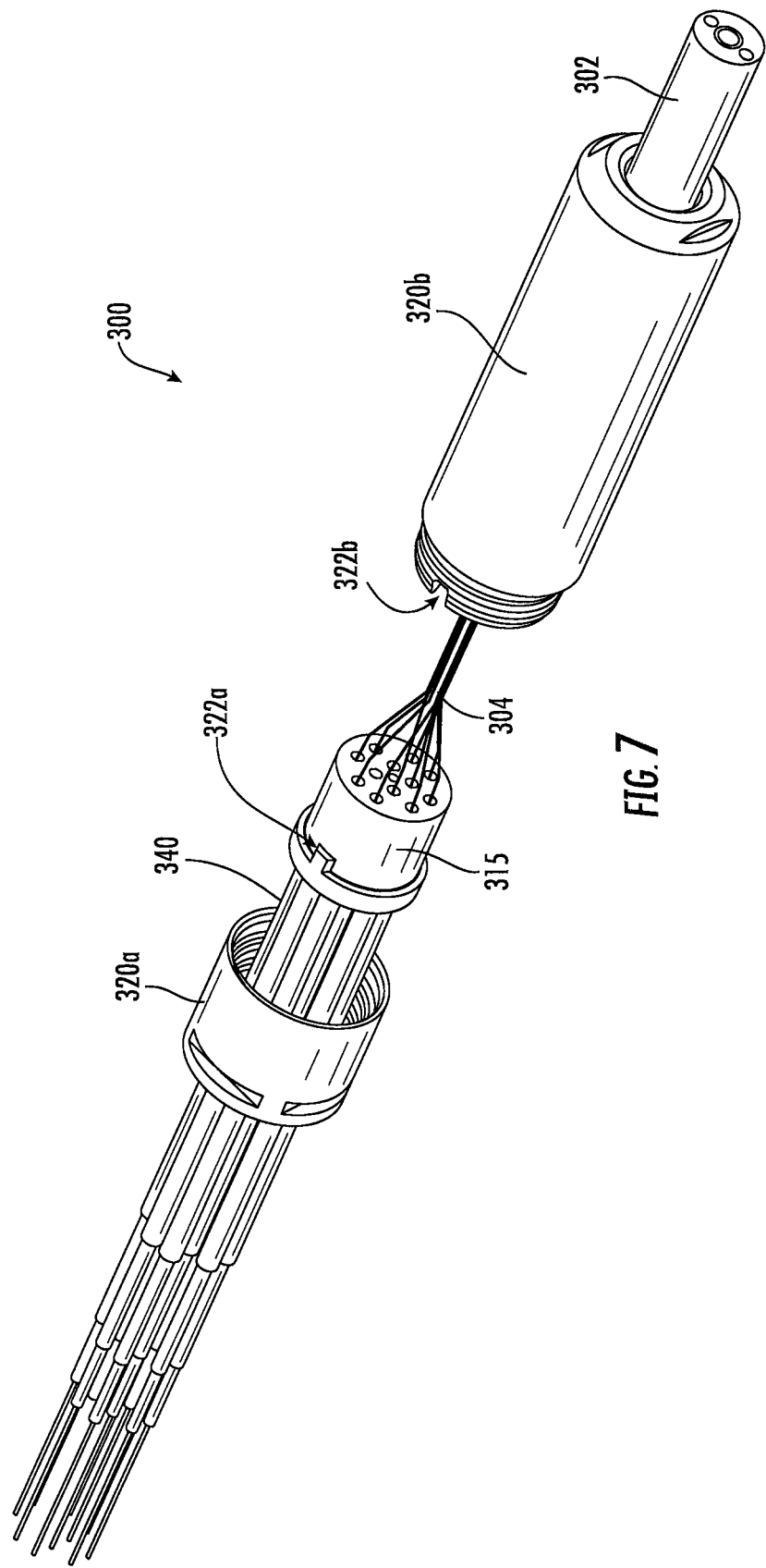
FIG. 7 is a perspective view of another fusion spliced cable assembly breakout kit according to embodiments of the present invention.

Referring now to FIG. 7, the fusion splice cable assembly breakout kit 300 of the present invention may further include an anti-rotation mechanism 322. As shown in FIG. 7, the terminated cable assembly 315 may comprise an anti-rotation key 322a and the main body 320b of the protective sleeve 320 may comprise an anti-rotation notch 322b. The anti-rotation notch 322b may be configured to receive and secure the anti-rotation key 322a. When the anti-rotation key 322a is secured in the anti-rotation notch 322b, the terminated cable assembly 315 is prevented from rotating within the protective sleeve 320, such as, for example, when the top 320a of the protective sleeve is being rotated (i.e., screwed) onto the main body 320b of the protective sleeve 320. Preventing the terminated cable assembly 315 from rotating within the protective sleeve 320 helps to further protect the optical fibers 304 from being damaged.

Figure 8A:
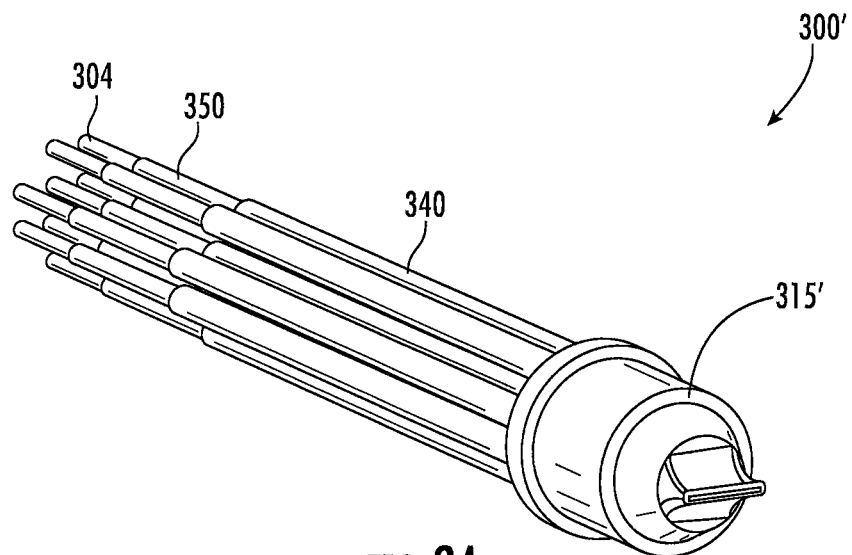
FIG. 8A is a perspective view of a ribbon fiber style furcation tube kit for another fusion spliced cable assembly breakout kit according to embodiments of the present invention.
Figure 8B:
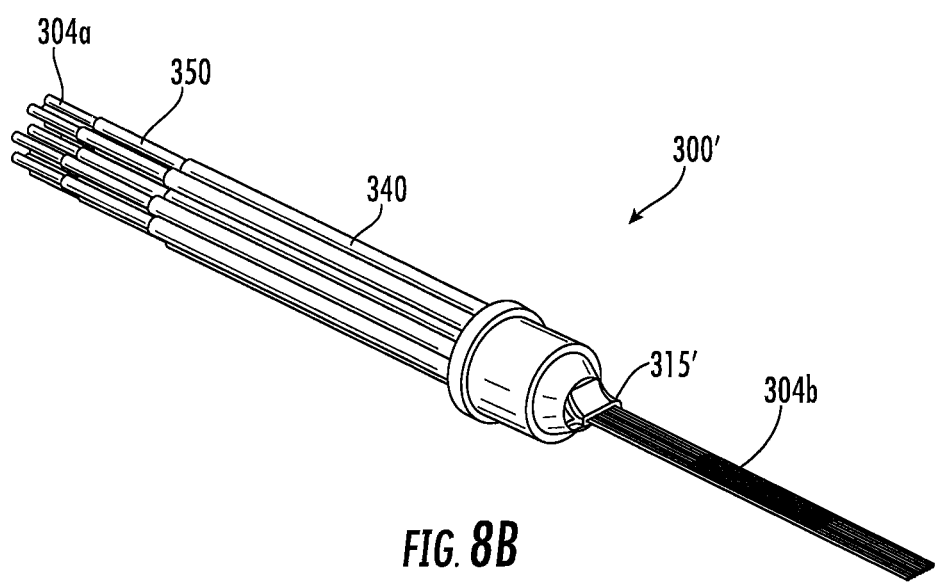
FIG. 8B is a perspective view of the ribbon fiber style furcation tube kit of FIG. 8A in combination with ribbonized fibers.
Figure 8C:
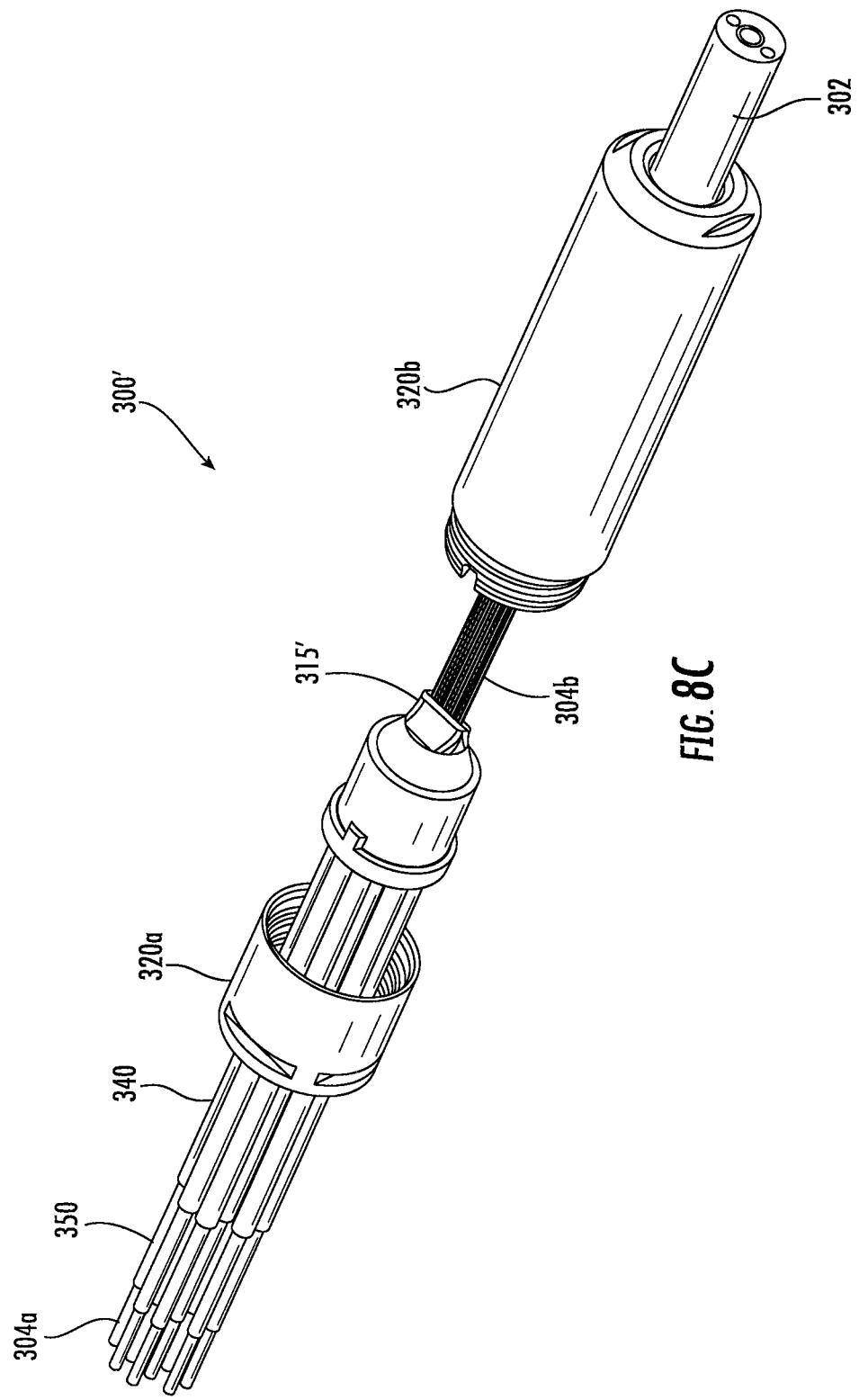
FIG. 8C is an exploded view of the fusion spliced cable assembly breakout kit of FIGS. 8A-8B.

Referring to FIGS. 8A-8C, another fusion splice cable assembly breakout kit 300' of the present invention is illustrated. The breakout kit 300' is similar to the fusion splice cable assembly breakout kit 300 described above except the terminated cable assembly 315 is substituted with a ribbon fiber style furcation tube kit 315'. The fusion splice cable assembly breakout kit 300' may be utilized when ribbonized optical fibers 304b are being fusion spliced together.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A fusion spliced cable assembly, the assembly comprising:
    a first and a second fiber optic cable, wherein an end of at least a first optical fiber from the first fiber optic cable is fusion spliced together with an end of at least a second optical fiber from the second fiber optic cable, the first optical fiber having a first length of prepared fiber extending from the spliced end of the first optical fiber to a transition point of the first optical fiber, the second optical fiber having a second length of prepared fiber extending from the spliced end of the second optical fiber to a transition point of the second optical fiber, wherein the transition point of the first optical fiber is a distance from the transition point of the second optical fiber, and wherein a total length of prepared fiber is equal to the sum of the first length of prepared fiber for the first optical fiber and the second length of prepared fiber for the second optical fiber;
    a support configured to engage at least a portion of the total length of prepared fiber such that the distance between the transition points of each optical fiber is less than the total length of prepared fiber of the first and second optical fibers; and
    a transition housing coupled to the first and second fiber optic cables and surrounding the support,
    wherein an end of each fiber optic cable is sealed within the transition housing,
    wherein the transition housing comprises slots configured to receive and secure the support within the transition housing.

2. The assembly of claim 1, wherein the support comprises pre-formed grooves configured to receive and secure at least a portion of the total length of prepared fiber in a folded condition within the support.

3. The assembly of claim 1, wherein the support comprises a generally cylindrical mandrel, at least a portion of the total length of prepared fiber being coiled around the mandrel.

4. The assembly of claim 1, wherein the first and second optical fibers have a minimum bend radius in the range of about 2.5 mm to about 7.5 mm.

5. The assembly of claim 1, wherein the first and second optical fibers comprise ribbonized optical fibers.

6. The assembly of claim 1, the assembly further comprising a fusion splice protection tube surrounding the spliced ends of the first and second optical fibers.

7. The assembly of claim 6, wherein the fusion splice protection tube comprises an optical adhesive or potting compound.

8. The assembly of claim 1, wherein the ends of each fiber optic cable are sealed within the transition housing by an adhesive heat shrink tube or over-molding.

9. The assembly of claim 1, wherein at least a portion of the first length of the prepared fiber of the first optical fiber and at least a portion of the second length of the prepared fiber of the second optical fiber are over-molded or potted with a polymer or composite polymer.

10. The assembly of claim 1, wherein at least a portion of the first length of the prepared fiber of the first optical fiber and at least a portion of the second length of the prepared fiber of the second optical fiber are secured to the support with filament-type pre-impregnated composite fibers.

11. The assembly of claim 1, wherein the transition housing has a length in the range of about 40 mm to about 200 mm.

12. The assembly of claim 1, wherein the total length of the prepared fiber is in the range of about 70 mm to about 500 mm.

13. The assembly of claim 1, wherein the distance between the transition point of the first optical fiber and the transition point of the second optical fiber is in a range of about 120 mm to about 500 mm.

14. The assembly of claim 1, wherein at least two portions of the first length of the prepared fiber of the first optical fiber and/or the second length of prepared fiber of the second optical fiber are substantially perpendicular to a longitudinal axis of the first and/or second optical fiber.

15. A fusion spliced cable assembly, the assembly comprising:
a first and a second fiber optic cable, wherein an end of at least a first optical fiber from the first fiber optic cable is fusion spliced together with an end of at least a second optical fiber from the second fiber optic cable, the first optical fiber having a first length of prepared fiber extending from the spliced end of the first optical fiber to a transition point of the first optical fiber, the second optical fiber having a second length of prepared fiber extending from the spliced end of the second optical fiber to a transition point of the second optical fiber, wherein the transition point of the first optical fiber is a distance from the transition point of the second optical fiber, and wherein a total length of prepared fiber is equal to the sum of the first length of prepared fiber for the first optical fiber and the second length of prepared fiber for the second optical fiber;
a support configured to engage at least a portion of the total length of prepared fiber such that the distance between the transition points of each optical fiber is less than the total length of prepared fiber of the first and second optical fibers, the support comprising pre-formed grooves configured to receive and secure at least a portion of the total length of prepared fiber in a folded condition within the support; and
a transition housing coupled to the first and second fiber optic cables and surrounding the support.

16. A fusion spliced cable assembly, the assembly comprising:
a first and a second fiber optic cable, wherein an end of at least a first optical fiber from the first fiber optic cable is fusion spliced together with an end of at least a second optical fiber from the second fiber optic cable, the first optical fiber having a first length of prepared fiber extending from the spliced end of the first optical fiber to a transition point of the first optical fiber, the second optical fiber having a second length of prepared fiber extending from the spliced end of the second optical fiber to a transition point of the second optical fiber, wherein the transition point of the first optical fiber is a distance from the transition point of the second optical fiber, and wherein a total length of prepared fiber is equal to the sum of the first length of prepared fiber for the first optical fiber and the second length of prepared fiber for the second optical fiber;
a support comprising a generally cylindrical mandrel configured to engage at least a portion of the total length of prepared fiber, wherein the engaged portion of the total length of prepared fiber is coiled around the mandrel such that the distance between the transition points of each optical fiber is less than the total length of prepared fiber of the first and second optical fibers; and
a transition housing coupled to the first and second fiber optic cables and surrounding the support.

17. A fusion spliced cable assembly, the assembly comprising:
a first and a second fiber optic cable, wherein an end of at least a first optical fiber from the first fiber optic cable is fusion spliced together with an end of at least a second optical fiber from the second fiber optic cable, the first optical fiber having a first length of prepared fiber extending from the spliced end of the first optical fiber to a transition point of the first optical fiber, the second optical fiber having a second length of prepared fiber extending from the spliced end of the second optical fiber to a transition point of the second optical fiber, wherein the transition point of the first optical fiber is a distance from the transition point of the second optical fiber, and wherein a total length of prepared fiber is equal to the sum of the first length of prepared fiber for the first optical fiber and the second length of prepared fiber for the second optical fiber;
a support configured to engage at least a portion of the total length of prepared fiber such that the distance between the transition points of each optical fiber is less than the total length of prepared fiber of the first and second optical fibers; and
a transition housing coupled to the first and second fiber optic cables and surrounding the support,
wherein at least a portion of the first length of the prepared fiber of the first optical fiber and/or at least a portion of the second length of the prepared fiber of the second optical fiber is substantially perpendicular to a longitudinal axis of the first and/or second optical fiber.

* * * * *